Oct. 7, 1958　　　H. MÜLLER　　　2,854,689
PORTIONING MACHINE FOR DISPENSING PASTY
MASSES, PARTICULARLY SAUSAGE MEAT
Filed Oct. 31, 1956　　　　2 Sheets-Sheet 1

Oct. 7, 1958     H. MÜLLER     2,854,689
PORTIONING MACHINE FOR DISPENSING PASTY
MASSES, PARTICULARLY SAUSAGE MEAT
Filed Oct. 31, 1956     2 Sheets-Sheet 2

United States Patent Office 2,854,689
Patented Oct. 7, 1958

2,854,689

PORTIONING MACHINE FOR DISPENSING PASTY MASSES, PARTICULARLY SAUSAGE MEAT

Hans Müller, Biberach (Riss), Germany, assignor to A. Handtmann Armaturenfabrik, Biberach (Riss), Germany, a corporation of Germany Application October 31, 1956, Serial No. 619,573

Claims priority, application Germany December 7, 1955

10 Claims. (Cl. 17—33)

My invention relates to portioning machines for dispensing pasty masses, particularly sausage meat, in which the devices for controlling the portioning operation, and, as the case may be, for also controlling the twist-off operation of a sausage-meat dispensing nozzle, are intermittently driven in a single direction of rotation. More particularly, my invention concerns a portioning machine of the above-mentioned type wherein the intermittent operation is produced by means of a crank drive and a free-wheeling or ratchet mechanism.

It is an object of my invention to improve such portioning machines so as to simplify the driving mechanism and simultaneously affording operation at two selective operating speeds.

In the known portioning machines operating with mechanical transmissions the portioning and dispensing operation is started and stopped by means of clutches or by starting and stopping the drive motor. To permit using short lengths of sausage casings and for dispensing individual portions, the portioning machines have been equipped with switching devices so designed that the machine, after each start, will selectively perform either a single operating cycle or will continue running until the attendant releases a start-control lever or actuates a stop control switch whereafter the machine stops upon completion of its last operating cycle. These machines are provided with electric control systems and electromagnetic clutches.

It is a more specific object of my invention to afford a selective machine performance of the last-mentioned kind with the aid of control mechanisms of much simpler design and essentially of mechanical type.

In order to achieve the above-mentioned objects and in accordance with a feature of my invention, I provide a crank-and-ratchet driven portioning machine with control means for selectively placing the ratchet mechanism of the drive into and out of motion-transmitting condition, thus affording a start-and-stop control of the portioning and dispensing operation of the machine simply by controlling the same ratchet mechanism that is anyhow required for portioning machines of this type.

According to a more specific feature of my invention, I provide the machine with a control disc that rotates intermittently together with the rotatable portioning and dispensing means of the machine and controls the start-and-stop control device for the ratchet mechanism so that, during any individual operating cycle of the machine, the ratchet mechanism can be switched on only in one of the dead-center positions of the preceding crank drive, and can be switched off only after the crank drive passes through the other dead-center position, independently of the moment at which the attendant may actuate the start-and-stop control device of the ratchet mechanism.

The start-and-stop control device for the ratchet mechanism operates entirely mechanically and is so designed that, selectively, the machine is stopped after completing a single operating cycle and dispensing only one portion of paste or sausage meat, or that the machine continues running until after the attendant releases a manual control member and until any then progressing operating cycle is terminated. For this purpose, according to another feature of my invention, I derive from those machine parts that are intermittently driven for performing each individual operating cycle, a control motion which interrupts a connection between the attendant-actuated start control member and the other machine parts that must cooperate with the control member to effect starting another operating cycle. As a result, the machine performance is automatically stopped even if the attendant leaves the start control member in the "start" position.

According to another feature of the invention, the just-mentioned automatic stop control means for automatically terminating the machine operation comprise a latch slider which is axially movable toward the above-mentioned rotatable control disc and is kept by a pawl member in latching engagement with the control disc in opposition to the force of a biasing spring. A switching lever, controlled by one or more cams rotating together with one of the intermittently operating machine parts, acts upon the latch slider for releasing it at the proper moment from its latching engagement with the control disc. Such a machine, compared with those previously known, combines with simplicity of design the advantages of shock-free operation and elimination of wear by virtue of the fact that the free-wheeling or ratchet mechanism enters into driving condition practically under zero-speed conditions.

According to still another feature of my invention I provide the machine with a rotary valve member for controlling the supply and cut-off of the paste or sausage mass, which rotates 90° during each individual portioning and dispensing cycle and which is provided with two valve channels that alternately establish, in the respective limit positions of the valve member, a communication from the portioning device to the ejector nozzle tube of the machine. The rotatable control-valve member is driven by a crank-drive link which performs a swinging motion through an angle of approximately 90° and directly imparts movement to the valve member only during motion of the crank-drive in a single stroke direction.

Such a device for controlling the supply of the paste or sausage mass affords further simplification because it obviates the mechanisms otherwise required for driving a supply control member through 180° and correspondingly increasing the oscillating angle of the crank-drive link at 180°. In addition, the provision of a supply-control valve member rotating through only 90° also permits reducing the required driving power.

In a machine according to the invention the direction of rotation of the drive motor, as well as of all shafts and gears located ahead of the crank mechanism, has no influence upon the direction of rotation of all machine parts operating behind the crank mechanism because the rotating direction of the latter parts is determined only by the active direction of the free-wheeling or ratchet device. This, according to a further feature of my invention, makes it possible to provide a single gear transmission with only three gears for selective machine operation at two different speeds. This gear transmission consists preferably of a driven external spur gear, a driven internal spur gear of a diameter different from that of the external gear, and a driving gear intermediate the two other gears and continuously in meshing engagement therewith. Controllable clutches, free-wheeling means or ratchets are disposed between the two respective driven gears and the machine parts to be driven from the respective two gears so that the rotation of the respective two driven gears is transmitted in only one sense of rotation, This permits selectively operating the machine at the two available speeds simply by reversing the driving motor.

The foregoing and other objects, advantages and features of my invention will be apparent from the embodiment of a sausage-mass dispensing machine illustrated by way of example on the accompanying drawings in which.

Figure 6:
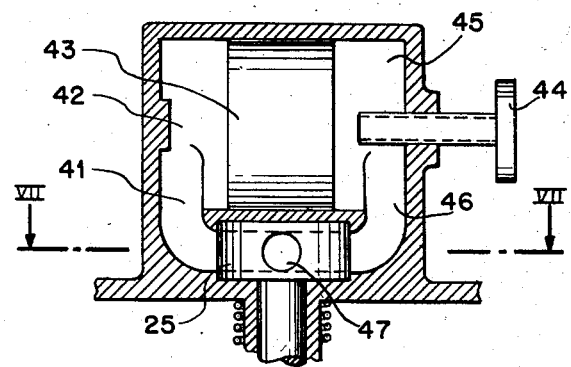
Fig. 6 is a vertical section through the portioning device taken along the line VI—VI in Fig. 1.
Figure 7:
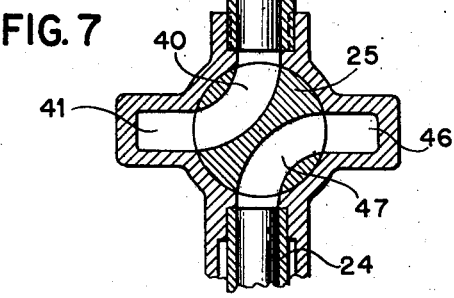
Fig. 7 is a cross-section taken along the line VII—VII in Fig. 6.

The sausage mass enters under high pressure through an inlet pipe 39 (Figs. 1, 7) and passes through a channel of a rotatable control-valve member 25 into the space 42 of a portioning device 420 which receives a pre-adjusted quantity of the mass. As explained more fully below, the portioning device is provided with a portioning piston 43 (Fig. 6) the movement of which, by the incoming mass, forces a previously portioned mass to leave the device. The portioning device ejects the previously apportioned quantity of sausage mass through another channel of member 25 into an ejector-nozzle tube 24 from which a corresponding quantity is then shot into a sausage casing previously placed upon the outlet portion of nozzle tube 24. Immediately thereafter, the tube 24 performs a rotary "cut-off" motion to twist the sausage casing tight against the previously ejected quantity of sausage mass.

The nozzle tube 24 and the control-valve member 25 which, as will be explained, also controls the operation of the portioning device, are driven from a reversible electric motor 1. The pinion 2 of motor 1 meshes simultaneously with a centrally located external spur gear 3 and a concentrically arranged internal or annular spur gear 4 both rotatably mounted on a shaft 6. The central gear 3, having the smaller diameter, then rotates at greater speed than the annular gear 4. When the pinion rotates in the direction of the arrow 2a indicated in Fig. 2, the annular gear 4 entrains shaft 6 in the direction indicated by an arrow 6a by means of a free-wheeling or ratchet device of any suitable type. The illustrated embodiment has a ratchet pawl 7 (Figs. 1, 2) which engages a notch in shaft 6 under the pressure of a U-shaped leaf spring 5. Consequently, shaft 6 rotates together with annular gear 4 in the direction of arrow 6a only when the pinion 2 of motor 1 rotates in the direction of arrow 2a, but shaft 6 is not entrained with gear 4 when the pinion 2 rotates in the opposite direction. A free-wheeling or ratchet device 7' of the same design (Fig. 1) is disposed between the central spur gear 3 and the same shaft 6. Under the operating conditions exemplified by arrows 2a and 6a in Fig. 2, the spur gear 3 can freely rotate in the opposite sense of rotation (opposed to arrow 6a) because the ratchet device 7' in gear 3 has a motion-transmitting action in the same sense as the device 7 in gear 4. When the rotation of drive motor 1 and hence of its pinion 2 is reversed, then the shaft 6 is entrained by the ratchet device 7' in the faster running gear 3. Consequently, the two directions of rotation of motor 1 correspond to respectively different speeds of shaft 6, the sense of rotation of shaft 6 being invariable. Since, as will be understood from the following, a change in the direction of rotation of shaft 6 does not affect the functioning of the machine, it will be understood that the above-described portion of the drive can be modified by transmitting each of the two speeds and two directions of rotation from gear 3 and gear 4 to the shaft 6 by means of respective controllable clutches (not illustrated).

Regardless of which ratchet or clutch device 7 or 7' is active at a time, a pinion 8b (Fig. 1) on shaft 6 always drives a spur gear 8 which is rotatable on a stationary pivot shaft 8c. Spur gear 8 forms the input member of a driving transmission including a crank mechanism and carries a crank pin 11 which is linked by a linking rod 12 (Fig. 1, 3, 4) with a crank pin 10 mounted on a rotatable entrainer disc 9 which forms the driving or output member of the crank mechanism and also a member of a ratchet device or free-wheeling mechanism for imparting unidirectional, intermittent rotary motion to the control-valve member 25 and the nozzle tube 24. During rotation of spur gear 8, the link 12 imparts to entrainer disc 9 an oscillating rotary motion because the crank-pin radius $r$ (Fig. 3) at spur gear 8 is smaller than the crank-pin radius $R$ at entrainer disc. The radii $r$ and $R$ are such that the angle of oscillation of entrainer disc 9 amounts to slightly more than 90°. This oscillates valve 25 correspondingly.

Figure 1:
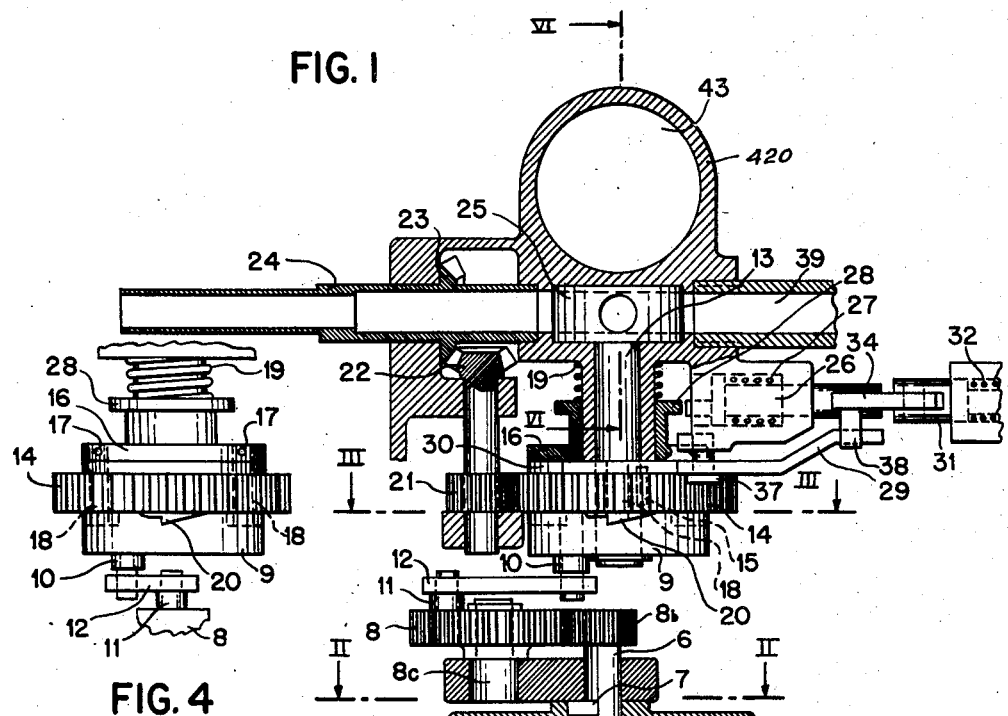
Fig. 1 shows schematically a sectional front view of the essential components of the machine.
Figure 4:
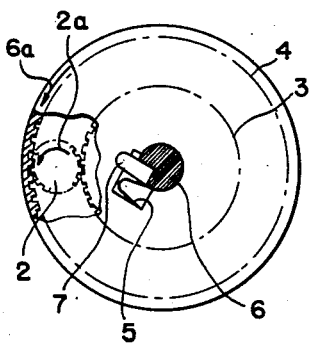
Fig. 4 is a side view of the ratchet mechanism and crank drive of the machine.
Figures 2, 3:
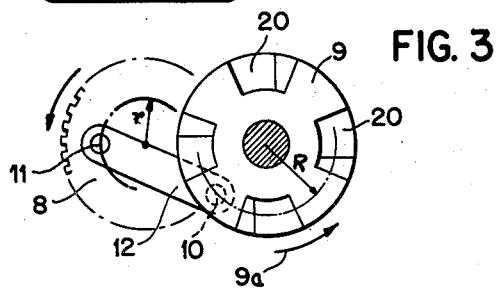
Fig. 2 shows a cross-section through the transmission for providing two selective operating speeds, the cross-section being taken along the line II—II in Fig. 1, parts being broken away for clarity.
Fig. 3 is a cross-section along the line III—III in Fig. 1.
Figure 5:
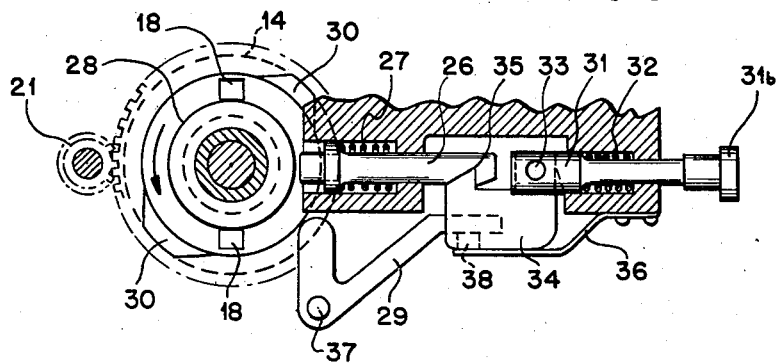
Fig. 5 is a part-sectional top view of a start control device also appertaining to the same machine.

The entrainer disc 9, a driving member, is rotatably mounted on a control shaft 13 in coaxial relation to a spur gear 14 which is the driven member and is joined with shaft 13 by means of a key 15 preventing relative rotation between gear 14 and shaft 13. The spur gear 14 has two rectangular holes slidably traversed by respective pawl rods 18 which are secured by pins 17 to a control disc 16 and are axially displaceable relative to gear 14 (Figs. 1, 4, 5). A spring 19 (Figs. 1, 4) acts upon control disc 16 and continuously presses the pawl rods 18 against the upper surface of the entrainer disc 9. Machined into this upper surface are four recesses 20 (Figs. 1, 3). The lower ends of rods 18 and the recesses 20 are bevelled so that gear 14 and control disc 16 are entrained only when the entrainer disc 9 moves in the one direction of oscillation indicated in Fig. 3 by an arrow 9a. During the oscillating stroke of disc 9 in the opposite direction, the spur gear 14 and the on and off control or switching disc 16 remain at rest.

A pinion 21 meshing with spur gear 14 drives the nozzle sleeve 24 through bevel gears 22 and 23 during the rotary cut-off operation of the nozzle tube mentioned above. The control shaft 13 is directly joined with the valve member 25 which, as mentioned, controls the supply of the mass to be processed as well as the ejection of the apportioned quantity into the nozzle tube 24.

The start and stop control operation of the machine is as follows:

When the entrainer disc 9 is moving on its return stroke in the direction opposed to that indicated by the arrow 9a in Fig. 3, the spur gear 14 (Figs. 1, 5) remains at rest. Since the active tips of the two pawl rods 18 as well as the mating recesses 20 of spur gear 14 are slanted as apparent from Fig. 1, the return-stroke movement causes the slanting faces of recesses 20, in the disc 9, to lift the two pawls 18 and the control disc 16 axially upward against the pressure of spring 19. Prior to that moment, a latch pin 26 (Figs. 1, 5) had its front face pressed by a spring 27 against a flange 28 of the control disc 16. Now, upon the lifting of the control disc 16, the latch pin 26, spring-biased radially against the control disc 16, is shoved beneath the flange 28. This prevents axial downward movement of the control disc 16, and the pawl rods 18 can no longer enter into the recesses 20 of entrainer disc 9. As a result, the portioning and ejecting operation of the machine is stopped after completion of a full working cycle, that is, after rotation of control member 25 and nozzle sleeve 24.

For starting the machine operation, the latch pin 26 (Figs. 1, 5) is pulled out, against the pressure of the spring 27, by pulling knob 31b as explained below. This releases the control disc 16, and the pawl rods 18 enter into engagement with two diametrically opposite recesses 20 as soon as the pawls 18 reach the proper position of registry with these recesses. This is the case when the crank-drive mechanism, comprising the components 8, 9, 10, 11 and 12, is in a dead-center or end of stroke position. At that moment, the entrainer disc 9 is theoretically at standstill, thus securing a reliable arresting operation and negligible wear. The machine remains switched on for portioning and ejecting operation as long as the latch pin 26 is retained in the pulled-out position.

For the dispensing of individual quantities or the processing of short lengths of sausage casings it is desirable to have the machine automatically stop the dispensing operation upon completion of each individual operating cycle. For this purpose there is provided a double-armed lever 29 (Figs. 1, 5) which is displaceable about its pivot 37 so that it enters into the active range of control cams 30 (Fig. 5) secured to the spur gear 14 and rotating together therewith. However, this control motion can be imparted to lever 29 by means of other suitable manual or automatic control device (not illustrated).

By pulling the knob 31b of a start-control slide 31 in opposition to the force of a return spring 32, a pivot pin 33 mounted on slider 31 displaces a pawl member 34, pivoted on pin 33, toward the right (Fig. 5). The pawl hook of member 34 then engages a notch 35 of latch pin 26 so that the pulling of knob 31b has the effect of withdrawing the latch pin 26 from the flange 28 of control disc 16. This causes starting of the machine operation in the above described manner. A pivoting motion of the pawl member 34 during the just described operation is prevented by means of a leaf spring 36.

The control cams 30 connected with the spur gear 14 start rotating as soon as the pawl rods 18 have entered into the recesses 20 of the entrainer disc 9. One of the two cams 30 will then abut against one arm of lever 29. This turns the lever 29 about its stationary pivot 37 so that the other arm of lever 29 is pressed against a lug 38 of pawl member 34. Pawl member 34 thus turns against the pressure of leaf spring 36 counterclockwise about the pivot pin 33 with the effect of pulling the pawl nose out of the notch 35. Latch pin 26 is thus released and is forced by spring 27 to move toward the left until it rests against the flange 28 of control disc 16. After reversal of the oscillating stroke direction of entrainer disc 9, the control disc 16 is displaced axially upward in the above-described manner so that the latch pin 26 can enter beneath the flange 28 thus stopping the portioning and dispensing operation of the machine. A new cycle of machine operation can be initiated by releasing and again pulling the start-control button 31b.

While the portioning and dispensing operation has been briefly mentioned above, a more detailed description of this performance will now be given.

The sausage mass, subjected to the high pressure within a filling or feeder machine (not illustrated), enters through the supply pipe 39 (Figs. 1, 7) and, when control member 25 is at standstill, passes through a channel 40 of rotatable member 25 (Fig. 7) and through a stationary channel 41 (Fig. 6) into the portioning chamber 42. The feed pressure causes a portioning piston 43 to move toward the right until it abuts against a set screw 44 by means of which the stroke of the portioning piston 43 and hence the weight of each individual quantity of mass can be adjusted. The quantity of mass portioned in the preceding operating cycle is simultaneously forced by the displacement of piston 43 to pass through a stationary channel 46 and a registering channel 47 (Fig. 7) of rotatable control member 25 into the nozzle sleeve 24 and thus into the sausage casing (not illustrated) previously shoved upon the tubular end portion of the nozzle sleeve. Thereafter the nozzle sleeve 24 rotates to effect the above mentioned twisting and cut-off operation, and the control member 25 rotates 90° as explained above. After completion of these rotary movements, the channel 47 in control member 25 connects the supply pipe 39 with the portioning chamber 45, and the channel 40 of control member 25 connects the portioning chamber 42 with the nozzle sleeve 24. The mass now passes from the supply pipe 39 through channels 47 and 46 into the portioning chamber 45. This causes the piston 43 to move toward the left, and the previously portioned quantity of mass in chamber 42 is now ejected through channels 41 and 40 into the nozzle sleeve 24.

It will be obvious to those skilled in the art, upon a study of this disclosure, that as regards design and details, my invention permits of various modifications and may be embodied in devices other than the machine particularly illustrated and described herein, without departing from the essential features of my invention and within the scope of the claims annexed hereto.

I claim:

1. A portioning machine for dispensing pasty masses, particularly sausage masses, comprising a portioning device and a rotatable mass-dispensing nozzle tube, a control member intermittently rotatable in a given direction and mechanically connected with said portioning device and said nozzle tube for controlling entry of the pasty mass into the portioning device and exit of the portioned mass from said device through said tube, a driving transmission having a crank mechanism, a rotary oscillatory output member turned by said crank mechanism, a device having ratchet pawl means for transmitting unidirectional intermittent rotation to said control member and said tube in only one stroke direction of said oscillatory output member, said ratchet pawl means being movable between nontransmitting and transmitting positions respectively, and selective control means engaging said device for displacing said ratchet pawl means between said two positions to thereby control the operation of said portioning device and nozzle tube.

2. In a portioning and packaging machine for pasty masses, particularly for sausage masses, comprising a portioning device, portioning means in said device, said device having an intake into which said pasty mass is forced and having an outlet for portioned masses, a rotary control valve having passageways positionable to communicate the intake with the portioning means, alternate passageways of the valve connecting with the outlet, the mass being alternately portioned and pushed out by the portioning device, a rotatable outlet tube communicating with said outlet, the tube serving for connection of a packaging casing, the tube being intermittently rotated to twist the casing tight, transmission mechanism for intermittently turning the outlet tube and the valve, each in one direction, and drive means for said mechanism comprising an oscillating power driven device, an on-and-off switching means to operably connect and disconnect the oscillating member to and from the said transmission mechanism, said switching means disconnecting the oscillating member from said transmission mechanism to permit said mechanism to halt and thereby halt the rotation of the outlet tube and of the control valve while the pasty mass passes through said valve passageways into and out of said portioning device.

3. In a portioning and packaging machine for pasty masses, particularly for sausage masses, the improvement comprising a portioning device, portioning piston means in said device, said device having an intake into which said pasty mass is forced and having an outlet for portioned masses, a rotary control valve having passageways positionable to intermittently connect the intake to a selected one of oppositely directed faces of the piston means, the piston means alternately portioning the mass and pushing it out of the portioning device through said outlet, alternate passageways of the valve connecting with the outlet, a rotatable outlet tube communicating with said outlet, the tube serving for connection of a packaging casing, the tube being rotated to twist the casing tight, transmission mechanism for intermittently turning the outlet tube and the valve, each in one direction, and drive means for said mechanism comprising an oscillating power driven member, an on-and-off switching means to operable connect and disconnect the oscillating member to and from the said mechanism, said switching means disconnecting the oscillating member from said transmission mechanism to permit said mechanism to halt and thereby halt the rotation of the outlet tube and of the control valve while the pasty mass passes through said valve passageways into and out of said portioning device.

4. In a portioning and packaging machine for pasty masses, particularly for sausage masses, comprising a portioning device, portioning means in said device, said device having an intake into which said pasty mass is forced and having an outlet for portioned masses, a rotary control valve having passageways positionable to communicate the intake with the portioning means, alternate passageways of the valve connecting with the outlet, the mass being alternately portioned and pushed out by the portioning device, a rotatable outlet tube communicating with said outlet, the tube serving for connection of a packaging casing, the tube being intermittently rotated to twist the casing tight, transmission mechanism for intermittently turning the outlet tube and the valve, each in one direction, and drive means for said mechanism comprising an oscillating power driven device, an on-and-off switching means to operably connect and disconnect the oscillating member to and from the said transmission mechanism, said switching means disconnecting the oscillating member form said transmission mechanism to permit said mechanism to halt and thereby halt the rotation of the outlet tube and of the control valve while the pasty mass passes through said valve passageways into and out of said portioning device, said transmission means comprising gear means, a shaft rotated by said gear means, the rotary control valve being turned by said shaft, the switching device including a switching sleeve displaceable longitudinally of the shaft, the oscillating power driven device including a member turning freely on said shaft, ratchet pawls carried by said sleeve and engaging the gear means, the sleeve being spring pressed to push the ratchet pawls into abutment position with respect to the oscillating power driven member to permit turning of the gear means by the oscillating power driven member, the abutting portions of the pawls and the power driven member being shaped to permit said turning in one direction only and to cause displacement of the switching sleeve away from the power driven member when the latter is turned in the opposite direction.

5. The apparatus defined in claim 4, and a latch mechanism spring pressed to hold the switching sleeve in switched-off position, and a control rod operably connected to the latch mechanism.

6. The apparatus defined in claim 4, the switching sleeve having a shoulder, a latch mechanism having a latch face spring pressed against the shoulder when the switching sleeve is in switched-on position with the ratchet pawls in said abutment position, the latch face being spring pressed under the shoulder when the sleeve is in switching-off position.

7. In a portioning and packaging machine for pasty masses, particularly for sausage masses, comprising a portioning device, portioning means in said device, said device having an intake into which said pasty mass is forced and having an outlet for portioned masses, a rotary control valve having passageways positionable to communicate the intake with the portioning means, alternate passageways of the valve connecting with the outlet, the mass being alternately portioned and pushed out by the portioning device, a rotatable outlet tube communicating with said outlet, the tube serving for connection of a packaging casing, the tube being intermittently rotated to twist the casing tight, transmission mechanism for intermittently turning the outlet tube and the valve, each in one direction, and drive means for said mechanism comprising an oscillating power driven device, an on-and-off switching means to operably connect and disconnect the oscillating member to and from the said transmission mechanism, said switching means disconnecting the oscillating member from said transmission mechanism to permit said mechanism to halt and thereby halt the rotation of the outlet tube and of the control valve while the pasty mass passes through said valve passageways into and out of said portioning device, said transmission means comprising gear means, a shaft rotated by said gear means, the rotary control valve being turned by said shaft, the switching device including a switching sleeve displaceable longitudinally of the shaft, the oscillating power driven device including a member turning freely on said shaft, ratchet pawls carried by said sleeve and engaging the gear means, the sleeve being spring pressed to push the ratchet pawls into abutment position with respect to the oscillating power driven member to permit turning of the gear means by the oscillating power driven member, the abutting portions of the pawls and the power driven member being shaped to permit said turning in one direction only and to cause displacement of the switching sleeve away from the power driven member when the latter is turned in the opposite direction, a cam connected to turn with said shaft, a pivotally mounted double-armed first lever one arm of which is operated by the cam to pivot the first lever, a control element, a second lever pivoted on the control element, a latch spring pressed toward the switching sleeve, the second lever being spring pressed toward a position in which it operably connects the control element to the latch, a second arm of the first lever being positioned to pivot the second lever to disconnect the control element from the latch.

8. The apparatus defined in claim 2, the rotary control valve having, as its said passageways, two channels respective inlets and outlets of which are displaced approximately 90°, including a crank drive element for said oscillating power driven device which element performs an oscillatory swinging crank motion of approximately 90°, the crank drive element being effective to turn the transmission mechanism only during one swinging direction of the crank drive.

9. The apparatus defined in claim 2, the rotary control valve having, as its said passageways, two channels respective inlets and outlets of which are displaced approximately 90°, including a crank drive element for said oscillating power driven device which element performs an oscillatory swinging crank motion of approximately 90°, the crank drive element being effective to turn the transmission mechanism only during one swinging direction of the crank drive, a reversible drive motor for said crank drive element, a gear transmission between said motor and the crank drive element, the latter gear transmission comprising an intermediate gear connected to the motor shaft, a rotary shaft, an annular interiorly toothed driven gear, an inner exteriorly toothed driven gear, the intremediate gear driving both driven gears, devices which connect each driven gear separately to said shaft and which permit turning of the driven gears, and the shaft, by the intermediate gear in one and the same direction only.

10. In a portioning and packaging machine for pasty masses, particularly for sausage masses, comprising a portioning device, portioning piston means in said device, said device having an intake into which said pasty mass is forced and having an outlet for portioned masses, a rotary control valve having passageways positionable to intermittently connect the intake to oppositely directed faces of the piston means, the piston means alternately portioning the mass and pushing it out of the portioning device, alternate passageways of the valve connecting with the outlet, a rotatable outlet tube communicating with said outlet, the tube serving for connection of a packaging casing, the tube being rotated to twist the casing tight, transmission mechanism for intermittently turning the outlet tube and the valve, each in one direction, and drive means for said transmission mechanism comprising an oscillating power driven pivoted entrainer disc, an on-and-off automatic switching means to operably connect and disconnect the oscillating entrainer disc to and from the said transmission mechanism, said switching means disconnecting the oscillating member from said mechanism to permit said mechanism to halt and thereby halt the rotation of the outlet tube and of the control valve while the pasty mass passes through said valve passageways into and out of said portioning device, said entrainer disc providing two pairs of diametrically opposed recesses, said switching means including two diametrically opposed ratchet pawls adapted to seat in pairs of said recesses, a crank arm linked to said entrainer disc to oscillate the latter, the crank arm having two end of stroke positions, said transmission mechanism including gear means to turn said outlet tube and the valve, the pawls passing through and operatively connecting the gear means to the entrainer disc when the disc turns in said one direction, the pawls being so shaped that they ride out of the recesses when the disc turns in the opposite direction, the pairs of recesses being so positioned that the pawls register with a pair thereof when the crank arm is in one of its end of stroke positions.

References Cited in the file of this patent

UNITED STATES PATENTS

| | | |
|---|---|---|
| 1,292,645 | Reisfeld | Jan. 28, 1919 |
| 1,610,008 | Hirsch | Dec. 7, 1926 |
| 2,273,626 | Connell | Feb. 17, 1942 |

FOREIGN PATENTS

| | | |
|---|---|---|
| 571,281 | Germany | Feb. 25, 1933 |
| 593,429 | Germany | Feb. 26, 1934 |